(12) United States Patent
Horino et al.

(10) Patent No.: US 6,418,105 B1
(45) Date of Patent: Jul. 9, 2002

(54) OPTICAL DISK RECORDING DEVICE

(75) Inventors: Mamoru Horino; Kazuhiko Honda, both of Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/472,527

(22) Filed: Dec. 27, 1999

(30) Foreign Application Priority Data

Jan. 5, 1999 (JP) ............................................. 11-000723

(51) Int. Cl.[7] ............................... G11B 5/09; G11B 7/00
(52) U.S. Cl. ............................... 369/53.37; 369/124.05; 369/124.07; 369/44.26; 369/44.27
(58) Field of Search ......................... 369/44.26, 44.34, 369/44.41, 44.27, 44.35, 44.29, 275.3, 275.4, 124.05, 124.07, 124.14, 124.15, 53.31, 53.37, 47.55, 47.17, 47.23, 47.24, 47.27

(56) References Cited

U.S. PATENT DOCUMENTS

| | | | |
|---|---|---|---|
| 5,892,740 A | * 4/1999 | Nagasawa et al. | 369/275.3 |
| 5,949,745 A | * 9/1999 | Kim | 369/44.26 |
| 5,974,012 A | * 10/1999 | Ohmori et al. | 369/124.13 |
| 5,982,722 A | * 11/1999 | Hashimoto | 369/44.29 |
| 6,144,625 A | * 11/2000 | Kuroda et al. | 369/44.25 |
| 6,160,773 A | * 12/2000 | Maegawa et al. | 369/44.28 |
| 6,188,654 B1 | * 2/2001 | Kaku et al. | 369/124.07 |

* cited by examiner

Primary Examiner—Thang V. Tran
(74) Attorney, Agent, or Firm—Pillsbury Winthrop LLP

(57) ABSTRACT

Optical disk recording device includes a beam projection section for projecting a light beam onto a write-once optical disk, and a photodetector having two light receiving surfaces divided in a radial direction of the optical disk for detecting reflected light from the optical disk, and wobble-signal reproduction circuitry for reproducing a wobble signal on the basis of reflected light detection signals output from the two light receiving surfaces of the photodetector. The wobble-signal reproduction circuitry includes peak-holding circuits for, when the optical disk device is in a reproduction mode, detecting and holding respective upper envelopes of the two light detection signals from the photodetector. The wobble-signal reproduction circuitry also includes holding circuits for, when the optical disk device is in a recording mode, detecting respective lower envelopes of the two light detection signals from the photodetector. The reproduction circuitry further includes circuits for switching, between the reproduction mode and the recording mode, the light detection signals to be held by the holding circuits, and a subtraction circuit for performing a subtraction between values held by the holding circuits. Thus, the wobble-signal reproduction circuitry is allowed to produce, with a simple structure, a high-quality wobble signal free of high-frequency signal components.

4 Claims, 10 Drawing Sheets

REFLECTED LIGHT
DETECTION SIGNAL
IN RECORDING

SAMPLING
PULSE

RECORDING
SIGNAL

REFLECTED LIGHT
DETECTION SIGNAL
IN RECORDING

SAMPLING
PULSE

OPTICAL DISK RECORDING DEVICE

BACKGROUND OF THE INVENTION

The present invention relates to optical disk recording devices for write-once optical disks such as CD-R (Compact Disk-Recorder) and CD-RW (Compact Disk Write-Once) media, and more particularly to wobble-signal reproduction circuitry employed in such optical disk recording devices.

Conventionally, in the pit-forming tracks of write-once optical disks such as CD-Rs and CD-RWs, there are formed grooves called "pregrooves", which have pre-recorded therein absolute time information also known as ATIP (Absolute Time In Pregroove). Specifically, the ATIP information is recorded by wobbling the track grooves, and recording/reproduction control is performed on the basis of the ATIP information that is provided by reproducing signals representative of the track wobbles (hereinafter "wobble signals").

More specifically, the wobble signals of the optical disk are produced by processing outputs from a position-detecting photodetector of an optical pickup. Specifically, the position-detecting photodetector comprises, for example, a four-quadrant or four-part photodiode which is so named because it has a set of four light receiving surfaces A, B, C and D. Two combinations of the surfaces (A+D) and (B+C) form two composite light receiving surfaces that are divided in the radial direction of the optical disk along a demarcation line extending along the tracks, and other two combinations of the surfaces (A+B) and (C+D) form other two composite light receiving surfaces that are divided in the radial direction of the optical disk along another demarcation line extending in a direction transverse to the tracks. EFM (Eight to Fourteen Modulation) signals modulated on the basis of presence/absence of pits in the optical disk are each detected in the same phase by the light receiving surfaces A, B, C and D, while the wobble signals are each detected in opposite phases by the two composite light receiving surfaces (A+D) and (B+C). The wobble signal can thus be extracted by performing a subtraction between light detection signal outputs from the two-composite light receiving surfaces (A+D) and (B+C) to thereby remove the EFM signal components therefrom.

Conventional wobble-signal reproduction circuitry is constructed typically in a manner as shown in FIG. 9. Namely, sample-and-hold (S/H) circuits are provided in corresponding relation to the outputs from the light receiving surfaces of the four-quadrant photodiode. The outputs from the first combination of the light receiving surfaces are added together, and similarly the outputs from the second combination of the light receiving surfaces are added together, so as to provide signals indicative of the added results (A+D) and (B+C) (i.e., (A+D) signal and (B+C) signal). Then, a wobble signal is produced by performing a subtraction between the added results (A+D) and (B+C). In recording, a sampling operation is carried out to sample the light detection signals (i.e., return light, from the optical disk, of laser light modulated by the EFM signal) output from the sample-and-hold (S/H) circuits by capturing their respective bottom power levels, as illustrated in FIG. 10. However, in reproduction, the sample-and-hold (S/H) circuits are all maintained in a "through", i.e., "non-sampling/holding" state.

Because the high-frequency EFM signal components contained in the (A+D) and (B+C) signals are in the same phase, the EFM signal components can be cancelled out, in the reproduction process, by performing a subtraction between the (A+D) and (B+C) signals as long as these signals are equal in level, so that the conventional wobble-signal reproduction technique can provide a wobble signal with no adverse influence. If, however, there is a level difference between the (A+D) and (B+C) signals, the undesired EFM signal components cannot be completely removed from the wobble signal, which would lead to the inconvenience that accurate ATIP information cannot be obtained through the conventional wobble-signal reproduction technique.

To provide a solution to the above-mentioned inconvenience, a novel technique has been proposed, e.g., in Japanese Patent Application Laid-Open Publication Nos. HEI-6-44568 and HEI-8-63766, which is intended to improve the quality of the wobble signal by adjusting the amplitude levels of the EFM signal components, in the (A+D) and (B+C) signals, to equal each other. However, the proposed technique would require extra circuits, such as a variable gain circuit, to make the amplitude levels of the EFM signal components equal to each other.

Further, in the recording process, performing the sample-and-hold operation would entail problems, such as production of undesired noise at the rise and fall time of sampling pulses and holding offsets. Particularly, in the case of high-speed recording, a C/N (Carrier-to-Noise) ratio and quality of the wobble signals would greatly deteriorate because the sampling pulse widths are significantly narrowed. FIG. 11 shows a typical relationship between the light detection signal (representative of detected return light from the optical disk) and the sampling pulses, on a greater scale than FIG. 10. As seen from FIG. 11, a time difference τ between fall timing of each pulse of a recording signal and rise timing of each sampling pulse is constant irrespective of a recording speed, so that the duty cycle of the sampling pulses decreases as the recording speed is increased, which would create deterioration of the C/N ratio.

SUMMARY OF THE INVENTION

It is therefore an object of the present invention to provide an optical disk recording device equipped with wobble-signal reproduction circuitry which, with a simple structure, permits production of a high-quality wobble signal free of high-frequency signal component leaked thereto.

According to a first aspect of the present invention, there is provided an optical disk recording device for recording data onto a write-once optical disk having a track wobbled on the basis of absolute time information, the optical disk recording device comprising: a beam projection section for projecting a light beam onto the optical disk; a photodetector having at least two light receiving surfaces divided in a radial direction of the optical disk for detecting reflected light from the optical disk; and wobble-signal reproduction circuitry for reproducing a wobble signal corresponding to a wobble of the track on the basis of first and second light detection signals output from the two light receiving surfaces of the photodetector, and which is characterized in that the wobble-signal reproduction circuitry includes: first and second peak-holding circuits for, when the optical disk recording device is in a reproduction mode, detecting and holding respective upper envelopes of the first and second light detection signals output from the photodetector; first and second bottom-holding circuits for, when the optical disk recording device is in a recording mode, detecting respective lower envelopes of the first and second light detection signals output from the photodetector; and a subtraction circuit for producing a wobble signal by performing a subtraction between values held by the first and second peak-holding circuits when the optical disk recording device is in the reproduction mode and performing a subtraction between values held by the first and second bottom-holding circuits when the optical disk recording device is in the recording mode.

According to a second aspect of the present invention, there is provided an optical disk recording device for recording data onto a write-once optical disk having a track wobbled on the basis of absolute time information, the optical disc recording device comprising: a beam projection section for projecting a light beam onto the optical disk; a photodetector having at least two light receiving surfaces divided in a radial direction of the optical disk for detecting reflected light from the optical disk; and wobble-signal reproduction circuitry for reproducing a wobble signal corresponding to a wobble of the track on the basis of first and second light detection signals output from the two light receiving surfaces of the photodetector, and which is characterized in that the wobble-signal reproduction circuitry includes: first and second polarity switching circuits for inverting polarities of the first and second light detection signals output from the photodetector, depending on whether the optical disk is in a reproduction mode or in a recording mode; first and second holding circuits for, when the optical disk recording device is in the reproduction mode, detecting and holding respective upper envelopes of the first and second light detection signals passed from the first and second polarity switching circuits and, when the optical disk recording device is in the recording mode, detecting and holding respective lower envelopes of the first and second light detection signals passed from the first and second polarity switching circuits; and a subtraction circuit for producing a wobble signal by performing a subtraction between values held by the first and second holding circuits.

By holding the bottom or peak values of the two light detection signals, for reproduction of the wobble signal, depending on whether the optical disk recording device is in the reproduction mode or in the recording mode, the present invention can remove high-frequency signal components of the EFM signal. Thus, the present invention can effectively prevent leakage of the high-frequency signal components into the reproduced wobble signal, without a need to adjust the EFM signal level using a separate level-adjustment circuit. Further, because no sample-and-hold circuit is employed in the present invention, it is possible to avoid the problematic C/N ratio deterioration that heretofore occurred in cases where the sample-and-hold circuit is used.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE PREFERRED EMBODIMENTS

Figure 1:
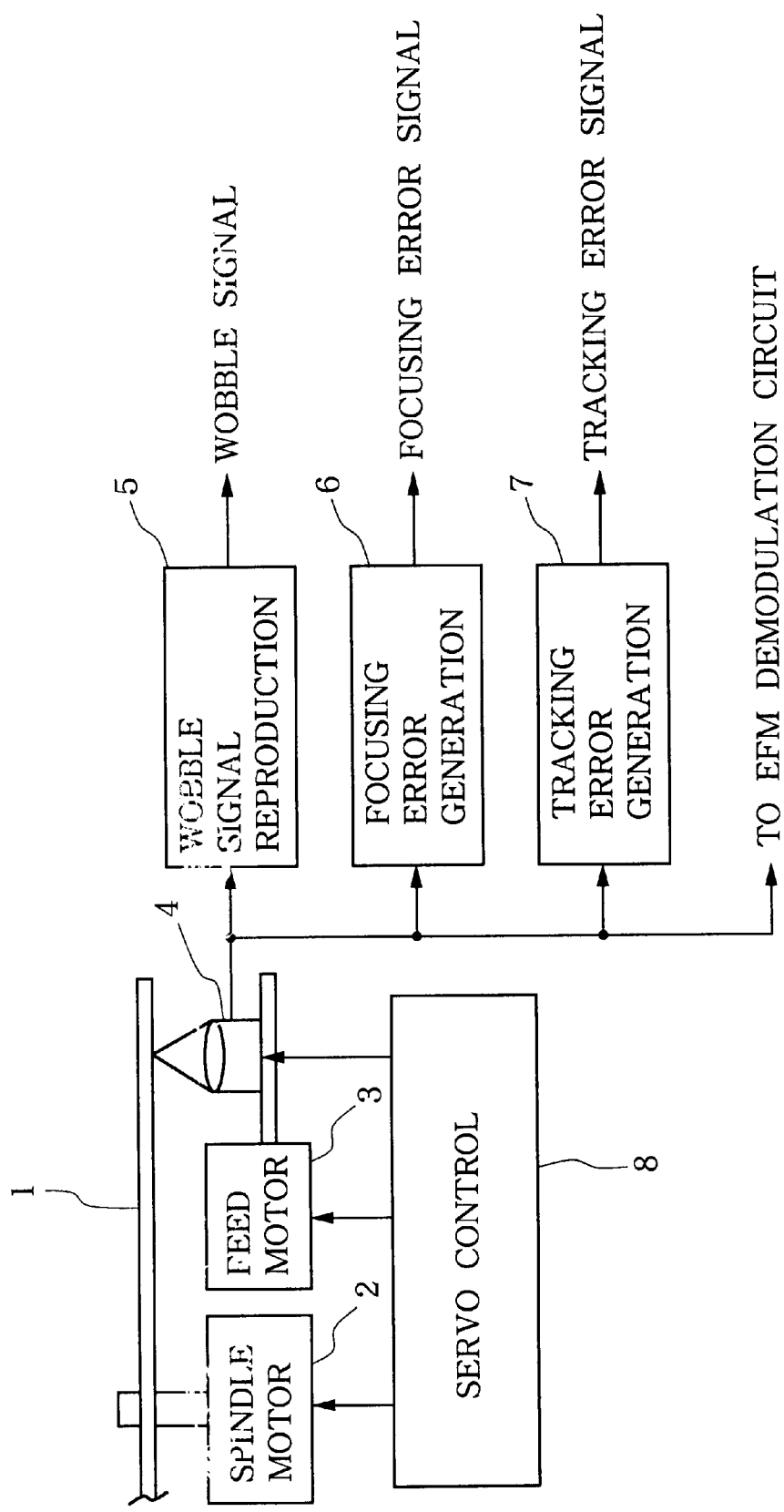
FIG. 1 is a block diagram showing a general organization of an optical disk recording device in accordance with a preferred embodiment of the present invention.

FIG. 1 is a block diagram showing an organization of principal components of an optical disk recording device in accordance with a preferred embodiment of the present invention, which is capable of operating both in a reproduction mode and in a recording mode as will be described in detail hereinbelow. Optical disk 1 shown in FIG. 1 is of a write-once type, which has tracks wobbled on the basis of absolute time information and is driven via a spindle motor 2 to rotate at a constant linear velocity. Optical pickup 4, as light beam projection/reflected light detection means, is provided in opposed relation to the recording surface of the optical disk 1. The optical pickup 4 is controllably driven to move in the radial direction of the optical disk 1 by a feed motor 3. The pickup feeding operations of the spindle motor 2 and feed motor 3 and focusing of the optical pickup 4 are controlled by a servo control section 8.

Signal indicative of light beam reflection from the optical disk 1, i.e., reflected light detection signal, is sent to an EFM demodulation circuit (not shown) and to wobble-signal reproduction circuitry 5 that reproduces a wobble signal from the reflected light detection signal. The reflected light detection signal is also delivered to a focusing-error signal generation circuit 6 and a tracking-error signal generation circuit 7 which generate a focusing error signal and a tracking error signal, respectively.

Figure 2:
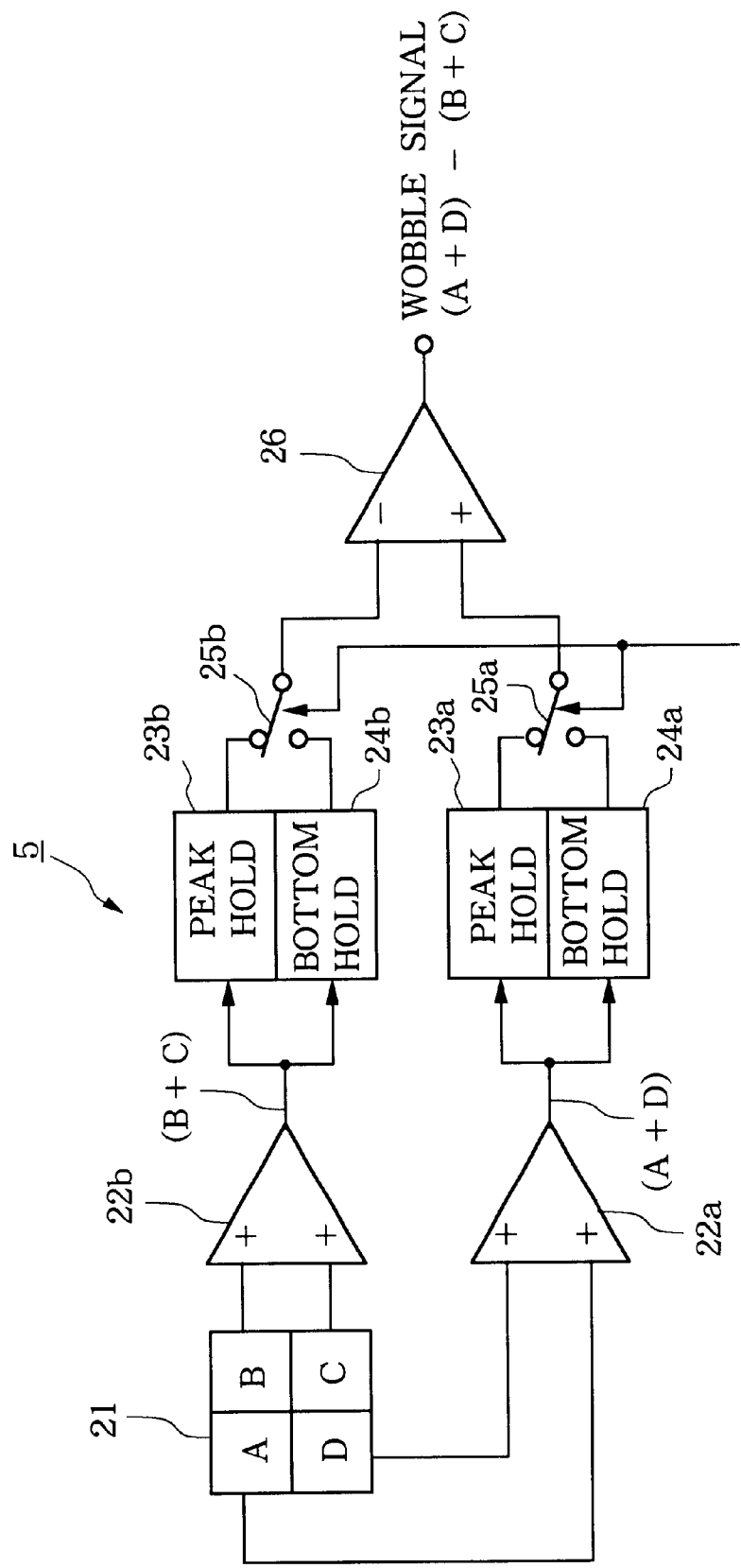
FIG. 2 is a block diagram showing an exemplary detailed organization of wobble-signal reproduction circuitry employed in the preferred embodiment of FIG. 1.

FIG. 2 is a block diagram showing an exemplary detailed organization of the wobble-signal reproduction circuitry 5, employed in the preferred embodiment, in relation to a four-quadrant photodiode of the optical pickup 4 which has four light receiving surfaces A, B, C and D. Two combinations of the light receiving surfaces (A+D) and (B+C) form two composite light receiving surfaces that are divided in a radial direction of the optical disk along a demarcation line extending along the tracks and other two combinations of the surfaces (A+B) and (C+D) form other two composite light receiving surfaces that are divided in the radial direction of the optical disk along another demarcation line extending in a direction transverse to the tracks. The outputs, i.e., reflected light detection signals, from the light receiving surfaces A and D are added together via an adder 22a and similarly the outputs from the other light receiving surfaces B and C are added together via another adder 22b, so as to provide signals indicative of the added results (A+D) and (B+C) (i.e., (A+D) signal and (B+C) signal).

The output of the adder 22a is coupled to a pair of peak-holding and bottom-holding circuits 23a and 24a, and similarly the output of the adder 22b is coupled to a pair of peak-holding and bottom-holding circuits 23b and 24b. When the optical disk device is in the reproduction mode, the peak-holding circuits 23a and 23b detect and hold the upper envelopes of the (A+D) and (B+C) signals, respectively, while the bottom-holding circuits 24a and 24b detect and hold the lower envelopes of the (A+D) and (B+C) signals, respectively.

Switching circuits 25a and 25b are each provided to switch between the corresponding peak-holding circuit 23a or 23b and the corresponding bottom-holding circuit 24a or 24b, depending on whether the optical disk recording device is in the reproduction mode or in the recording mode. Thus, a subtracter 26, in the reproduction mode, performs a subtraction between the outputs from the peak-holding circuit 23a and 23b to produce a wobble signal, but, in the recording mode, performs a subtraction between the outputs from the bottom-holding circuits 24a and 24b to produce a wobble signal.

Figure 3:
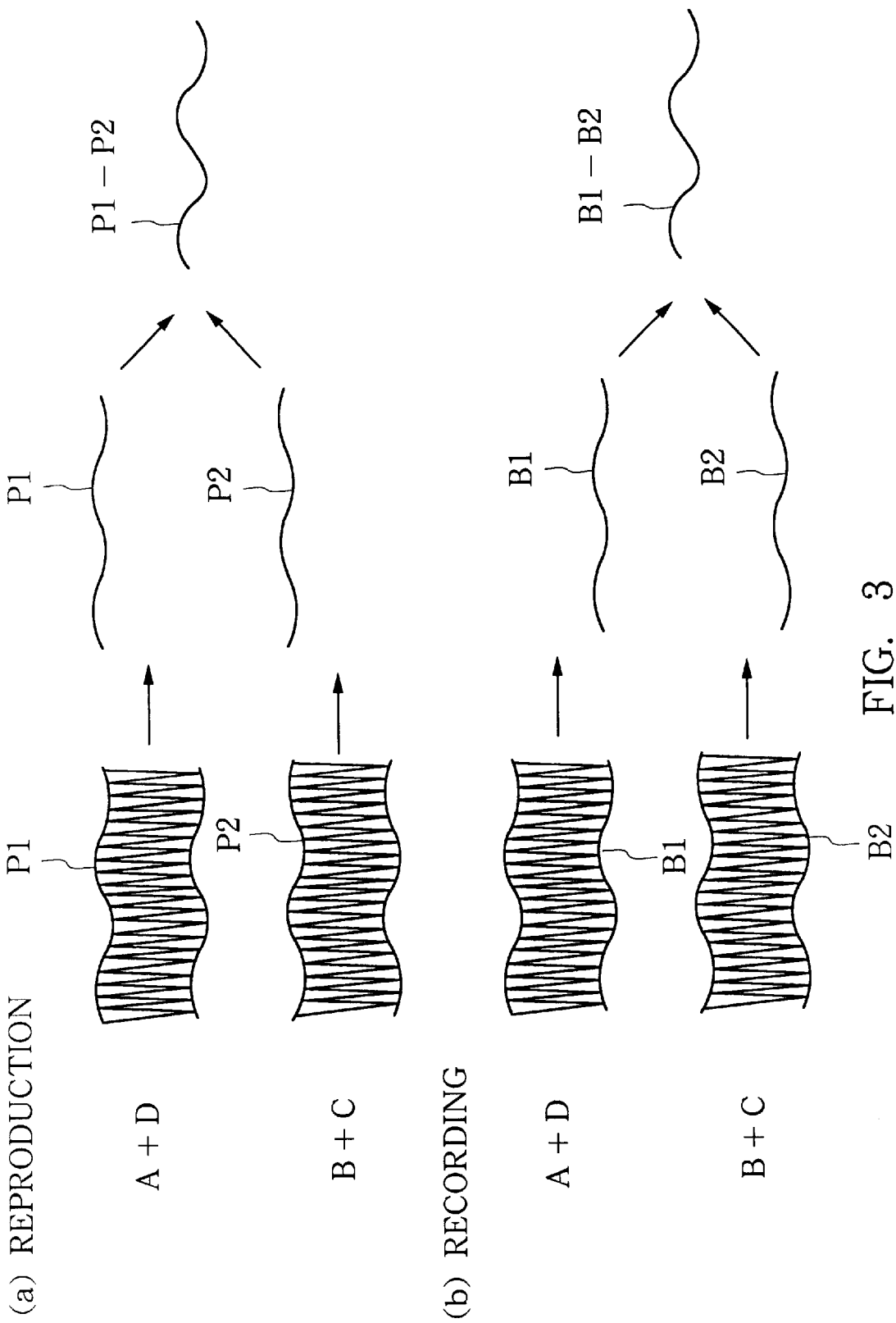
FIG. 3 is a diagram explanatory of behavior of the wobble-signal reproduction circuitry in the preferred embodiment.

FIG. 3 is a diagram explanatory of behavior of the wobble-signal reproduction circuitry 5 according to the preferred embodiment. In the figure, the respective upper envelopes of the (A+D) and (B+C) signals, containing the EFM signal components, correspond to a level of reflected light from a non-pit-formed location of the optical disk 1, and similarly the lower envelopes of the (A+D) and (B+C) signals, containing the EFM signal components, correspond to a level of reflected light from a pit of the optical disk 1; note that low-frequency wobble components are shown exaggeratedly for clarity. In the reproduction mode, as shown in part (a) of FIG. 3, the respective upper envelopes of the (A+D) and (B+C) signals are detected and held as peak values P1 and P2, and then a wobble signal is provided by a subtraction performed between the thus-held peak values P1 and P2. In the recording mode, as shown in part (b) of FIG. 3, the respective lower envelopes of the (A+D) and (B+C) signals are detected and held as bottom values B1 and B2, and then a wobble signal is provided by a subtraction performed between the thus-held bottom values B1 and B2.

Figure 4:
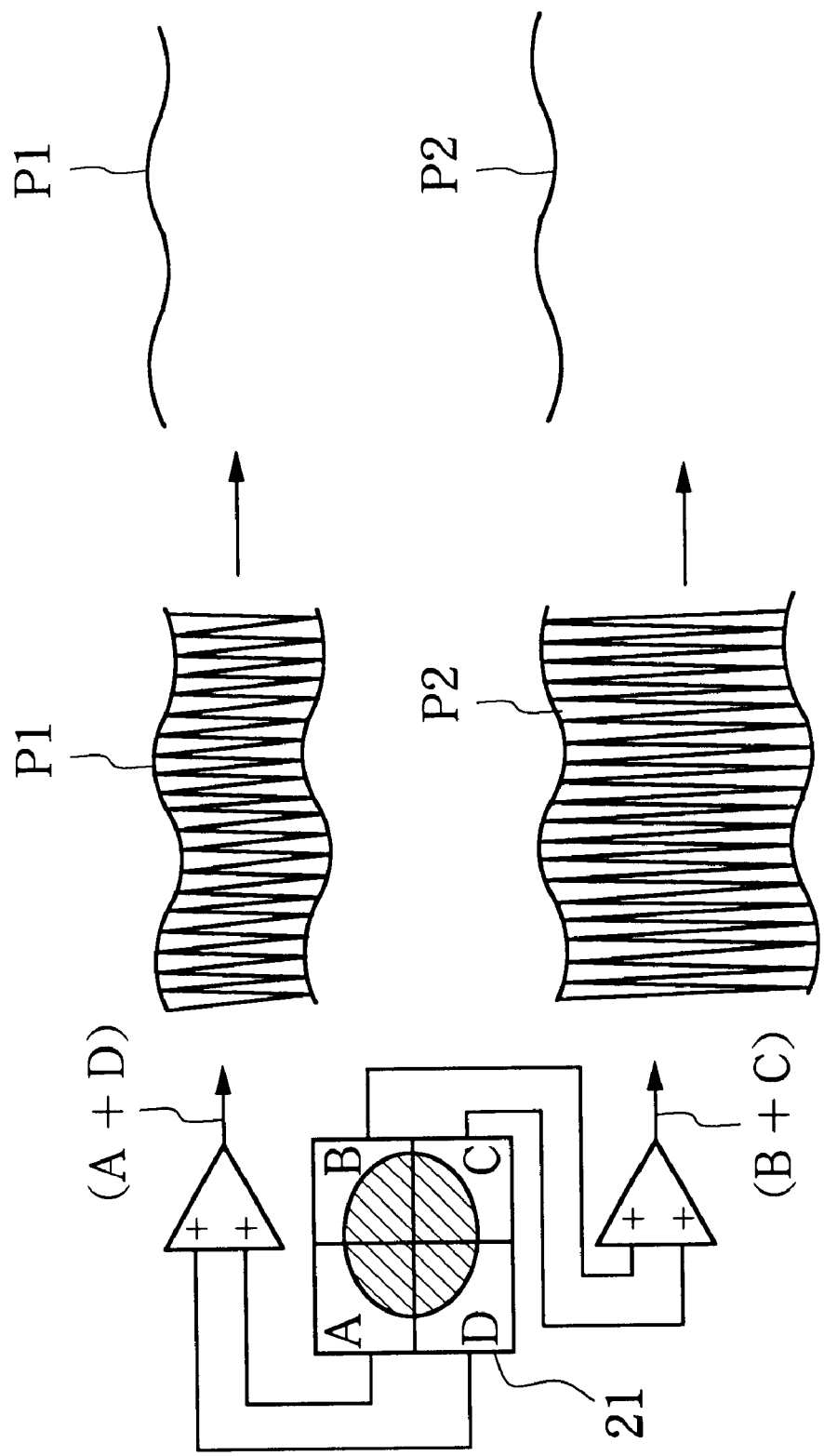
FIG. 4 is a diagram explanatory of operation of the wobble-signal reproduction circuitry when there is a level difference in EFM signal components detected by light receiving surfaces of a photodiode in the wobble-signal reproduction circuitry.

FIG. 4 is a diagram showing the (A+D) and (B+C) signals produced when the reflected light beam spot hits the photodiode array 21 with an offset from the array's center to the light receiving surfaces B and C, i.e., a greater proportion of the reflected light beam spot hits the light receiving surfaces B and C than the other light receiving surfaces A and D. If, in this case, a subtraction is performed merely between the (A+D) and (B+C) signals, a signal indicative of the subtracted result would contain EFM signal components. Thus, the preferred embodiment, in the reproduction mode, performs a subtraction between the peak values P1 and P2 of the (A+D) and (B+C) signals, as noted earlier, to thereby remove the unwanted EFM signal components. Similarly, in the recording mode, the preferred embodiment performs a subtraction between the bottom values B1 and B2 of the (A+D) and (B+C) signals so as to remove the unwanted EFM signal components.

Figure 5:
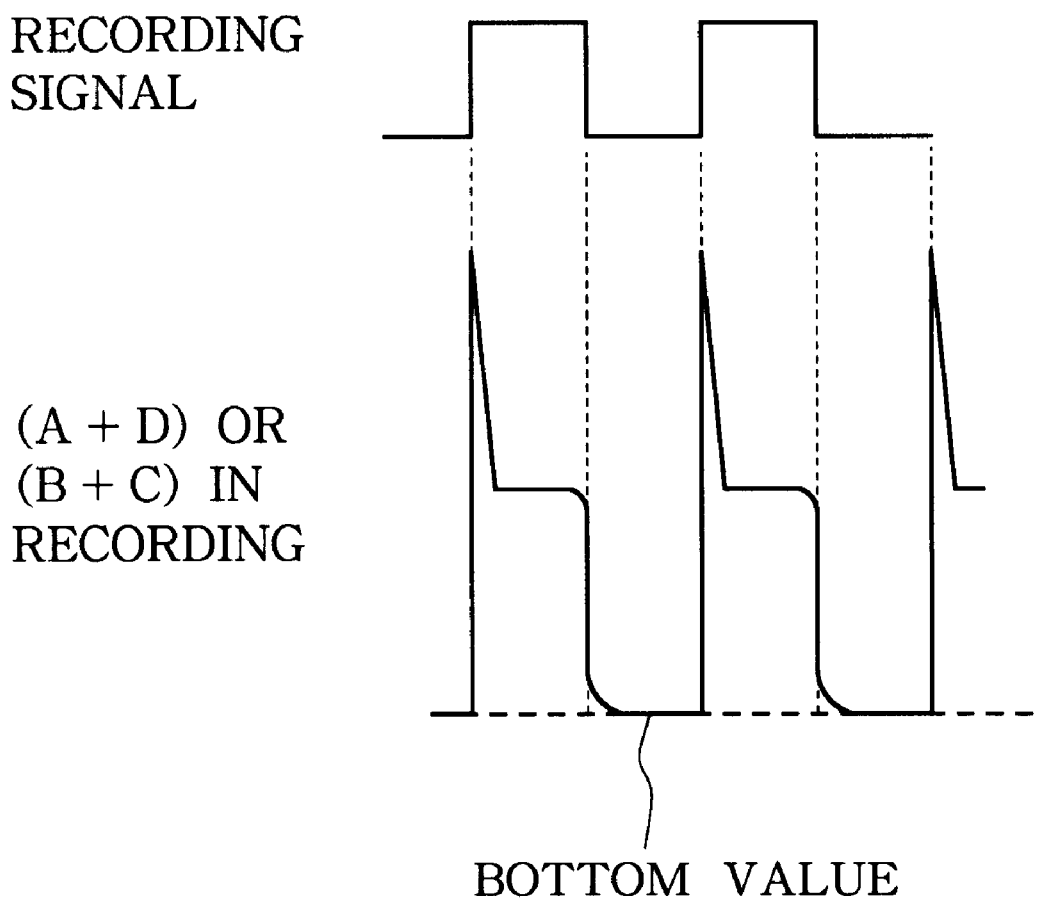
FIG. 5 is a waveform diagram explanatory of bottom-holding operations of the wobble-signal reproduction circuitry in a recording mode.
Figure 11:
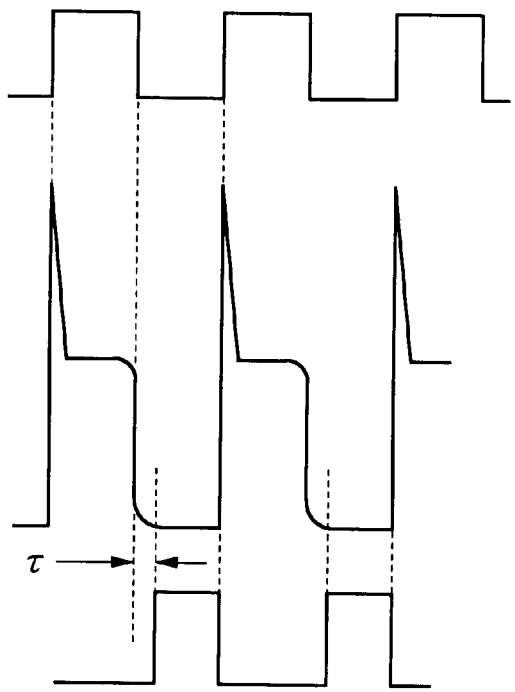
FIG. 11 illustrates in greater detail the waveform diagram of FIG. 10 explanatory of recording operations by conventionally-known wobble signal reproduction circuitry.

Further, in contradistinction to FIG. 11, FIG. 5 shows a waveform of the (A+D) or (B+C) signal in the recording mode with the time axis extended for purposes of clarity. Because the preferred embodiment is designed to hold the bottom values of the (A+D) and (B+C) signals without subjecting the signals to the sample-and-hold operations, it can effectively avoid the problematic sampling noise and holding offsets and thus significantly improve the wobble signal quality particularly in cases when the recording was conducted at high speed.

Figure 6:
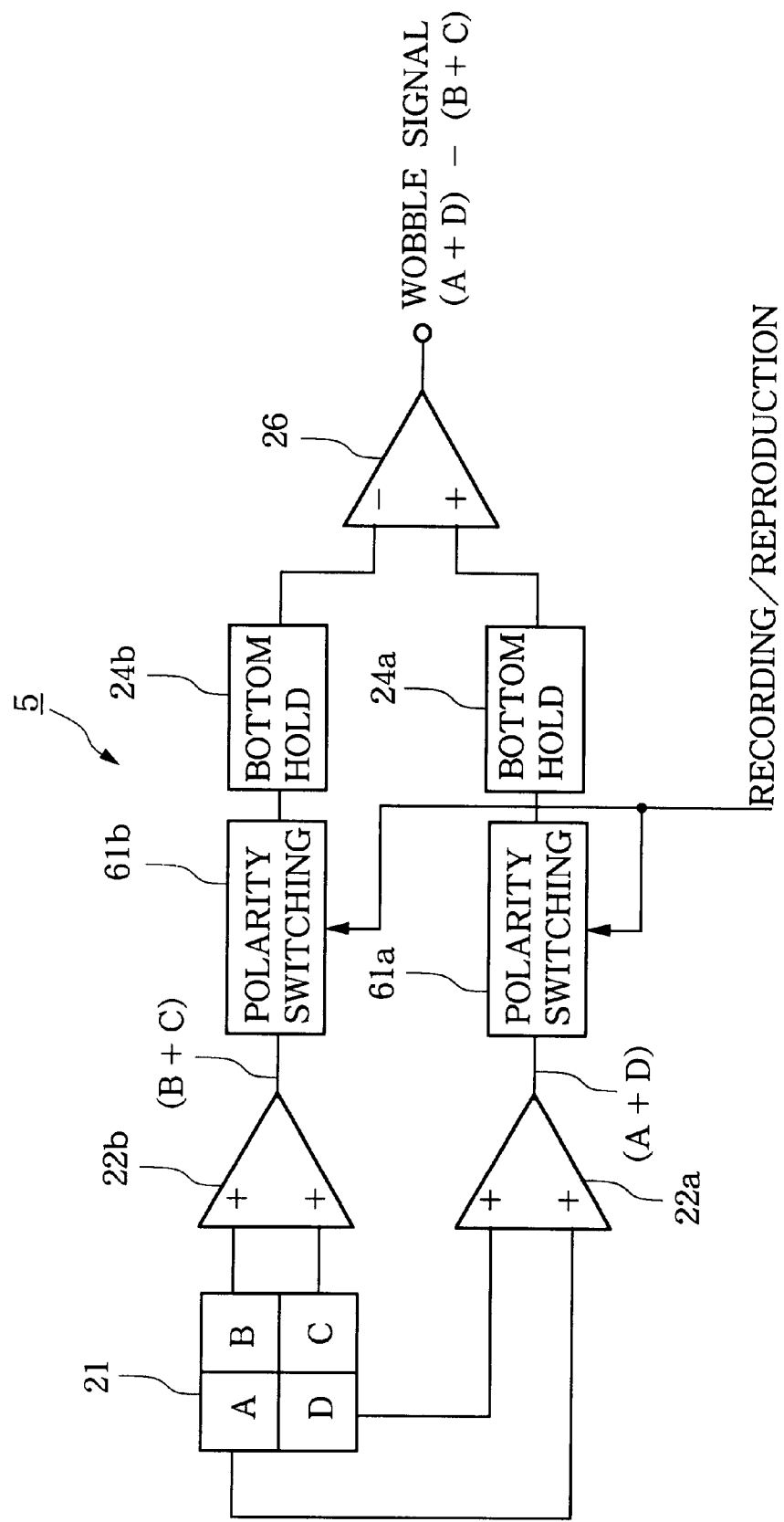
FIG. 6 is a block diagram showing another example of the organization of the wobble-signal reproduction circuitry.

FIG. 6 is a block diagram showing another example of the organization of the wobble-signal reproduction circuitry 5. In this example, polarity switching circuits 61a and 61b are coupled with the outputs of the adders 22a and 22b, respectively, to switch the polarities of the (A+D) and (B+C) signals between the reproduction mode and the recording mode, so that the polarity-controlled outputs from the polarity switching circuits 61a and 61b are passed to the corresponding bottom-holding circuits 24a and 24b.

More specifically, when the optical disk device is in the reproduction mode, the polarity switching circuits 61a and 61b invert the polarities of the (A+D) and (B+C) signals, but when the optical disk is in the recording mode, the polarity switching circuits 61a and 61b do not invert the polarities of the (A+D) and (B+C) signals. In this way, the bottom-holding circuits 24a and 24b are allowed to hold the peak values P1 and P2 in the reproduction mode and hold the bottom values B1 and B2 in the recording mode, in just the same manner as the first example of FIG. 2.

According to the wobble-signal reproduction circuitry 5 arranged as shown in FIG. 6, each pair of the peak-holding and bottom-holding circuits 23a, 24a or 23b, 24b in the example of FIG. 2 can be implemented by just a single bottom-holding circuits 24a or 24b, so that it is possible to reduce the number of circuit components and hence the size and costs of the circuitry.

Figure 7:
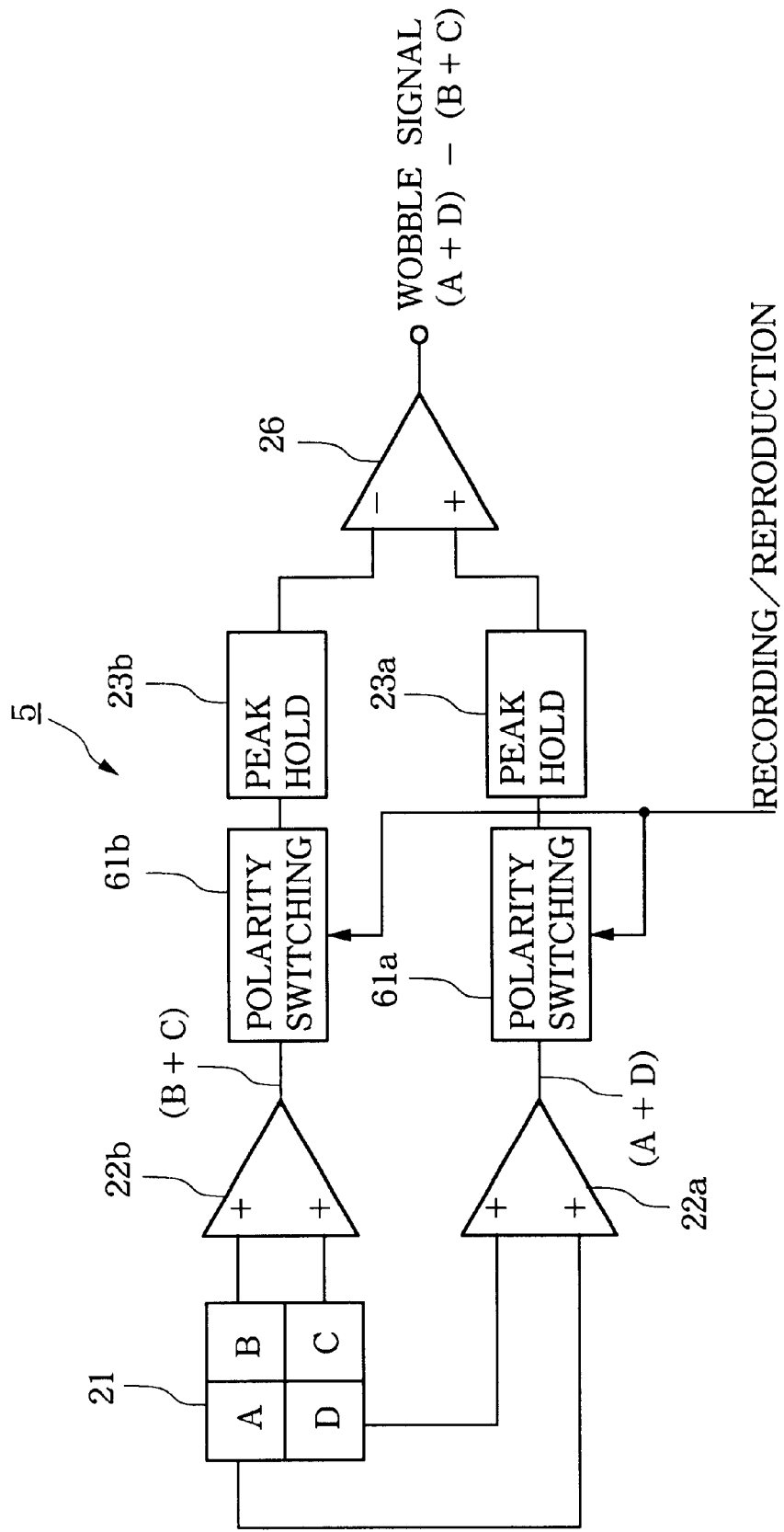
FIG. 7 is a block diagram showing still another example of the organization of the wobble-signal reproduction circuitry.

FIG. 7 is a block diagram showing still another example of the detailed organization of the wobble-signal reproduction circuitry 5, which is substantially similar to the example of FIG. 6 but different therefrom in that peak-holding circuits 23a and 23b are provided in place of the bottom-holding circuits 24a and 24b. In this case, the polarity switching circuits 61a and 61b invert the polarities of the (A+D) and (B+C) signals in the recording mode, but do not invert the polarities of the (A+D) and (B+C) signals in the reproduction mode. In this way, the peak-holding circuits 23a and 23b are allowed to hold the peak values P1 and P2 in the reproduction mode and hold the bottom values B1 and B2 in the recording mode, in the same manner as the earlier-described examples of FIGS. 2 and 6.

Figure 8:
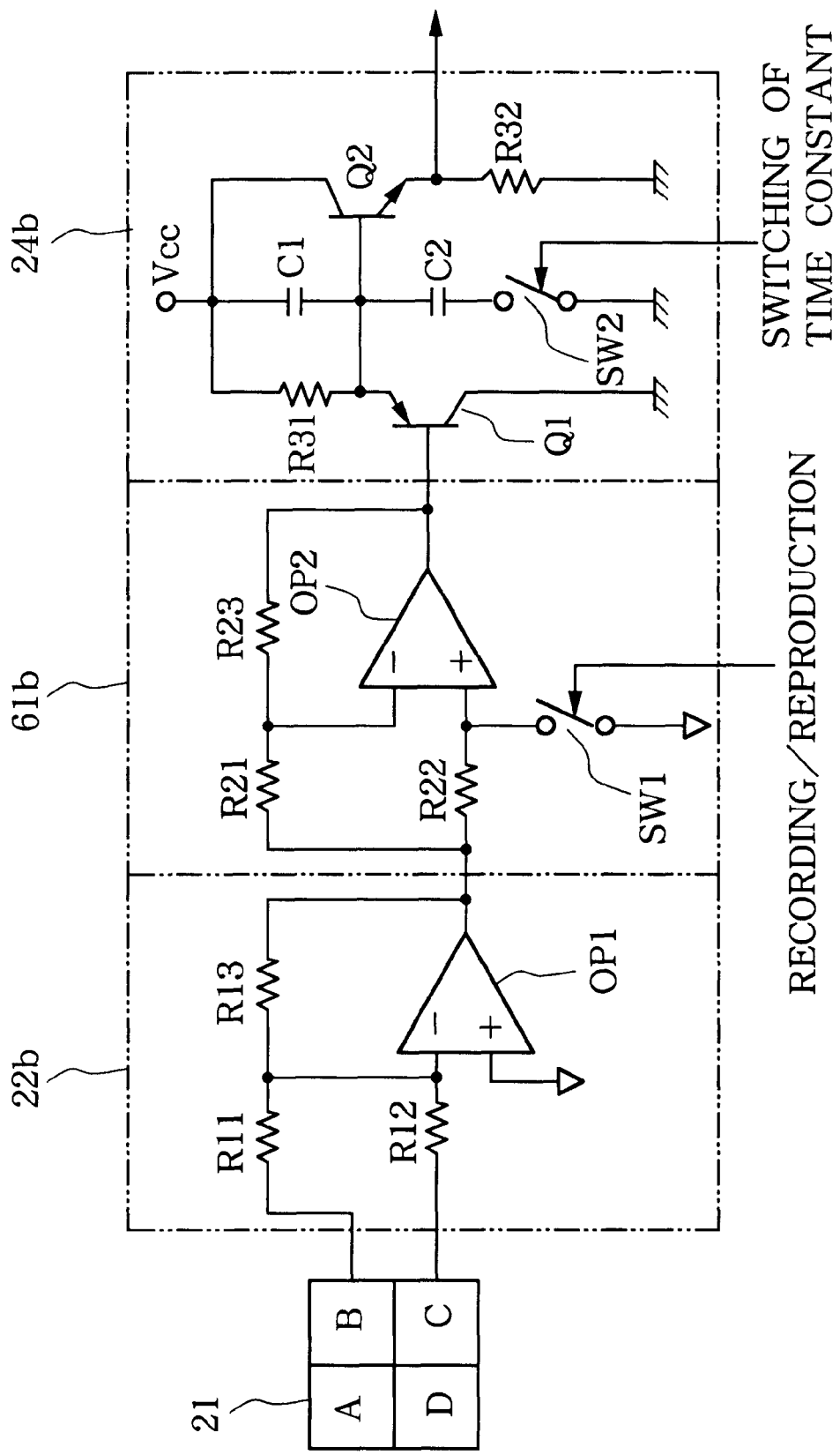
FIG. 8 is a diagram showing an exemplary detailed structure of the wobble-signal reproduction circuitry of FIG. 6.
Figure 9:
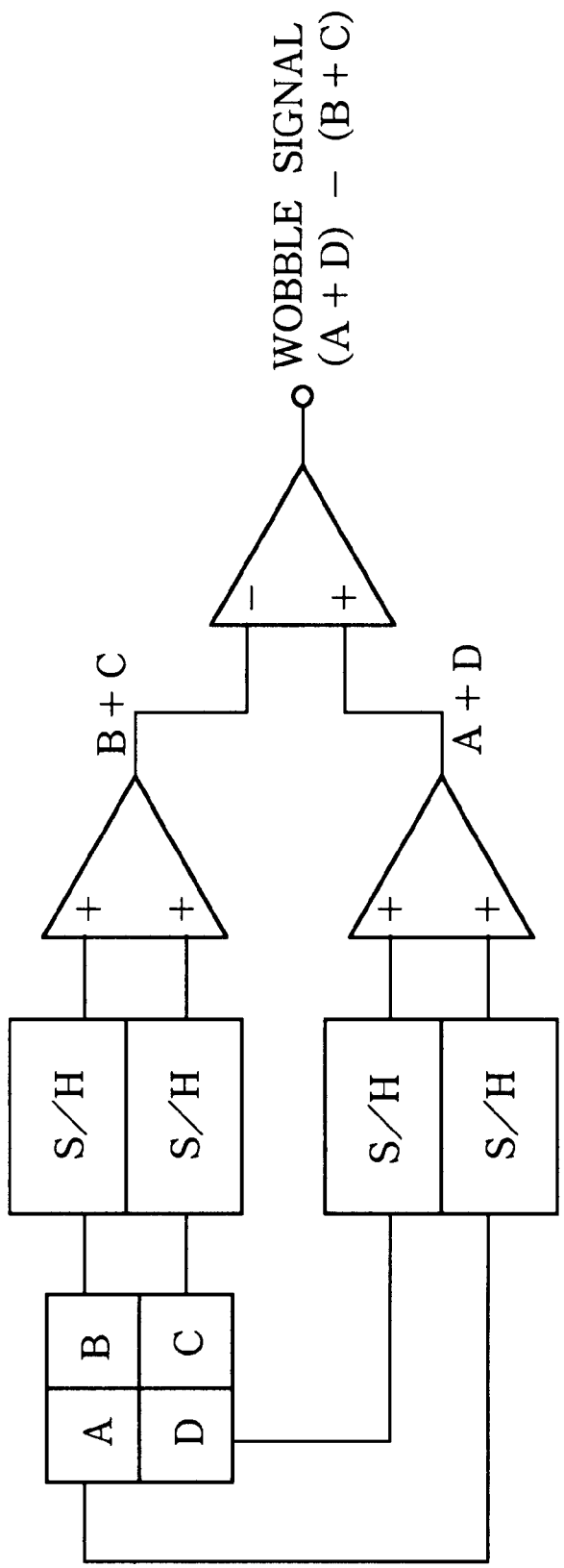
FIG. 9 is a block diagram showing an organization of conventionally-known wobble-signal reproduction circuitry.
Figure 10:
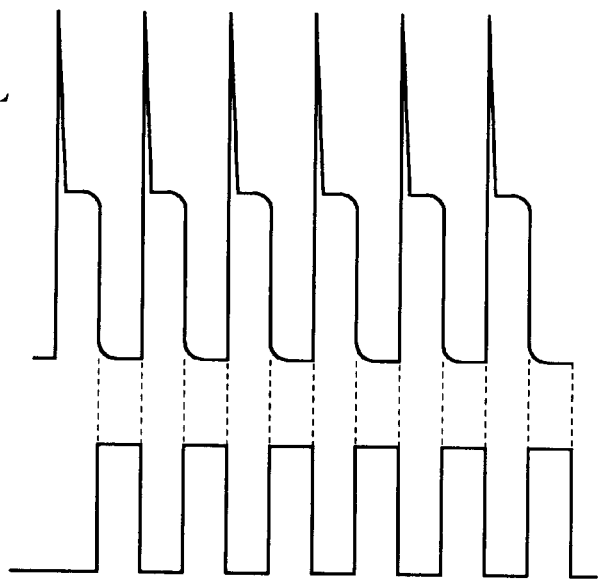
FIG. 10 is a waveform diagram explanatory of recording operations by the conventionally-known wobble-signal reproduction circuitry of FIG. 9.

Further, FIG. 8 shows an exemplary detailed structure of the circuit components associated with the (B+C) signal in the wobble-signal reproduction circuitry 5 of FIG. 6. It should be noted the circuit components associated with the (A+D) signal are arranged similarly although not specifically shown and described herein.

In FIG. 8, the adder 22b is a well-known circuit which includes an operational amplifier OP1 and resistors R11–R13, and the polarity switching circuit 61b is an amplifier circuit which includes an operational amplifier OP2 and resistors R21–R23. Switch SW1 is connected between a non-inverted input terminal of the operational amplifier OP2 and a ground terminal, and permits switching between inverted amplification and non-inverted amplification functions. Namely, in the recording mode, the switch SW1 is turned off to provide a non-inverted amplifier, while in the reproduction mode, the switch SW1 is turned on to provide an inverted amplifier.

The bottom-holding circuit 24b is constructed primarily of a first-stage emitter follower that includes a PNP transistor Q1 and a resistor R31, and a second-stage emitter follower that includes an NPN transistor Q2 and a resistor R32. Capacitors C1 and C2 are electrically connected in parallel to the resistor R31, so that the lower envelope of the input signal is detected with the high-frequency EFM signal components removed depending on the time constant of the resistor and capacitors. Switch SW2 is connected to the capacitor C2, which can change the time constant depending on a recording or reproduction speed. Namely, when the optical disk device is operating at low speed, the switch SW2 is turned on to increase the time constant but when the optical disk device is operating at high speed, the switch SW2 is turned off to decrease the time constant, so as to provide for an optimum envelope detection corresponding to the reproduction/recording speed.

In summary, the optical disk recording device according to the present invention is characterized by holding bottom or peak values of two reflected light detection signals, output from the optical pickup for reproduction of the wobble signal, depending on whether the optical disk device is in the reproduction mode or in the recording mode. With this characteristic arrangement, high-frequency signal components of the EFM signal and the like can be removed, which thus can effectively prevent leakage of the high-frequency signal components into the wobble signal without a need to adjust the EFM signal level using a separate adjustment circuit. Further, because no sample-and-hold circuit is employed in the present invention, it is possible to avoid the problematic C/N ratio deterioration that heretofore occurred in cases where the sample-and-hold circuit is used.

What is claimed is:

1. An optical disk recording device for recording data onto a write-once optical disk having a track wobbled on the basis of absolute time information, the optical disk recording device comprising: a beam projection section for projecting a light beam onto said optical disk; a photodetector having at least two light receiving surfaces divided in a radial direction of said optical disk for detecting reflected light from said optical disk; and wobble-signal reproduction circuitry for reproducing a wobble signal corresponding to a wobble of the track on the basis of first and second light detection signals output from the two light receiving surfaces of said photodetector, said wobble-signal reproduction circuitry including:

first and second peak-holding circuits for, when said optical disk recording device is in a reproduction mode, detecting and holding respective upper envelopes of said first and second light detection signals output from said photodetector;

first and second bottom-holding circuits for, when said optical disk recording device is in a recording mode, detecting respective lower envelopes of said first and second light detection signals output from said photodetector; and a subtraction circuit for producing a wobble signal by performing a subtraction between values held by said first and second peak-holding circuits when said optical disk device is in the reproduction mode and performing a subtraction between values held by said first and second bottom-holding circuits when said optical disk device is in the recording mode.

2. An optical disk recording device for recording data onto a write-once optical disk having a track wobbled on the basis of absolute time information, the optical disk recording device comprising: a beam projection section for projecting a light beam onto said optical disk; a photodetector having at least two light receiving surfaces divided in a radial direction of said optical disk for detecting reflected light from said optical disk; and wobble-signal reproduction circuitry for reproducing a wobble signal corresponding to a wobble of the track on the basis of first and second light detection signals output from the two light receiving surfaces of said photodetector, said wobble-signal reproduction circuitry including:

first and second polarity switching circuits for inverting polarities of said first and second light detection signals output from said photodetector, depending on whether said optical disk is in a reproduction mode or in a recording mode;

first and second holding circuits for, when said optical disk recording device is in the reproduction mode, detecting and holding respective upper envelopes of said first and second light detection signals passed from said first and second polarity switching circuits and, when said optical disk recording device is in the recording mode, detecting and holding respective lower envelopes of said first and second light detection signals passed from said first and second polarity switching circuits; and a subtraction circuit for producing a wobble signal by performing a subtraction between values held by said first and second holding circuits.

3. A method for recording data onto a write-once optical disk having a track wobbled on the basis of absolute time information, the method comprising steps of projecting a light beam onto said optical disk; detecting reflected light from said optical disk with a photodetector having at least two light receiving surfaces divided in a radial direction of said optical disk; and reproducing a wobble signal corresponding to a wobble of the track on the basis of first and second light detection signals output from the two light receiving surfaces of said photodetector, said wobble-signal reproduction step including steps of:

detecting and holding, in a reproduction mode, respective upper envelopes of said first and second light detection signals output from said photodetector;

detecting, in a recording mode, respective lower envelopes of said first and second light detection signals output from said photodetector; and producing a wobble signal by performing a subtraction between values of the upper envelopes in the reproduction mode and performing a subtraction between values of the lower envelopes in the recording mode.

4. A method for recording data onto a write-once optical disk having a track wobbled on the basis of absolute time information, the method comprising steps of projecting a light beam onto said optical disk; detecting reflected light from said optical disk with a photodetector having at least two light receiving surfaces divided in a radial direction of said optical disk; and reproducing a wobble signal corresponding to a wobble of the track on the basis of first and second light detection signals output from the two light receiving surfaces of said photodetector, said wobble-signal reproduction step including:

inverting polarities of said first and second light detection signals output from said photodetector, depending on whether said optical disk is in a reproduction mode or in a recording mode;

detecting and holding, in the reproduction mode, respective upper envelopes of said first and second light detection signals and, in the recording mode, detecting and holding respective lower envelopes of said first and second light detection signals; and producing a wobble signal by performing a subtraction between values of the upper envelopes and between values of the lower envelopes.

* * * * *